(12) United States Patent
Amminudin et al.

(10) Patent No.: US 11,873,454 B2
(45) Date of Patent: Jan. 16, 2024

(54) CRUDE HYDROCARBON FLUIDS DEMULSIFICATION SYSTEM

(71) Applicant: Saudi Arabian Oil Company, Dhahran (SA)

(72) Inventors: Kamarul Ariffin Amminudin, Dhahran (SA); Nagoorpitchai S. Meeranpillai, Al-Khobar (SA); Sultan H. Owaidhi, Jeddah (SA)

(73) Assignee: Saudi Arabian Oil Company, Dhahran (SA)

( * ) Notice: Subject to any disclaimer, the term of this patent is extended or adjusted under 35 U.S.C. 154(b) by 313 days.

(21) Appl. No.: 17/208,668

(22) Filed: Mar. 22, 2021

(65) Prior Publication Data
US 2021/0207040 A1 Jul. 8, 2021

Related U.S. Application Data

(62) Division of application No. 15/601,491, filed on May 22, 2017, now abandoned.

(51) Int. Cl.
*C10G 33/06* (2006.01)
*H05B 3/82* (2006.01)
(Continued)

(52) U.S. Cl.
CPC ........... *C10G 33/06* (2013.01); *B01D 17/042* (2013.01); *B01D 17/12* (2013.01); *C10G 33/08* (2013.01);
(Continued)

(58) Field of Classification Search
CPC ...... C10G 33/06; B01D 17/042; B01D 17/12; H05B 3/82; H05B 3/78; H05B 6/02; H05B 6/06; H05B 6/065
See application file for complete search history.

(56) References Cited

U.S. PATENT DOCUMENTS 1,405,119 A * 1/1922 Harris .................... C10G 33/02
204/673
1,612,557 A 12/1926 Weisgerber
(Continued)

FOREIGN PATENT DOCUMENTS

| CA | 2231565 | 1/1997 |
|---|---|---|
| CN | 2296230 | 11/1998 |

(Continued)

OTHER PUBLICATIONS

Chromalox, "Screw Plug Immersion Heaters Product Data Sheet," PD315-1, Oct. 1998, 6 pages.
(Continued)

*Primary Examiner* — Ryan B Huang
(74) *Attorney, Agent, or Firm* — Fish & Richardson P.C.

(57) ABSTRACT

An elongate, horizontally level, pipe includes a circumferential wall. The pipe flows, within the circumferential wall, process fluid that includes a first fluid and a second fluid immiscible with the first fluid. The first fluid and the second fluid are separated by an interfacial layer. Heating coils are disposed within the pipe. Each heating coil passes through an interior region of the pipe between the circumferential wall at a respective height from a bottom of the pipe. The heating coils generate heat. A controller is connected to the heating coils. The controller triggers at least one of the heating coils that is nearest to a location of the interfacial layer within the interior region to apply heat to the interfacial layer. The heat is sufficient to at least partially demulsify the interfacial layer.

17 Claims, 7 Drawing Sheets

(51) Int. Cl.
    *B01D 17/04*         (2006.01)
    *B01D 17/12*         (2006.01)
    *C10G 33/08*        (2006.01)

(52) U.S. Cl.
    CPC ......... *H05B 3/82* (2013.01); *H05B 2203/021* (2013.01)

(56) References Cited

U.S. PATENT DOCUMENTS

| | | | |
|---|---|---|---|
| 2,547,190 A * | 4/1951 | Wilson | C10G 33/06 |
| | | | 96/188 |
| 2,601,904 A | 7/1952 | Erwin | |
| 2,730,240 A | 1/1956 | Johnson | |
| 3,098,827 A * | 7/1963 | Kirkpatrick | C10G 33/04 |
| | | | 516/167 |
| 3,318,448 A | 5/1967 | Fryer | |
| 3,488,294 A | 1/1970 | Annand | |
| 4,226,689 A | 10/1980 | Mayse | |
| 4,252,631 A | 2/1981 | Hovarongkura et al. | |
| 4,415,426 A | 11/1983 | Hsu et al. | |
| 4,419,200 A | 12/1983 | Hsu et al. | |
| 4,581,112 A | 4/1986 | Mintz et al. | |
| 4,582,629 A | 4/1986 | Wolf | |
| 4,996,490 A | 2/1991 | Scott et al. | |
| 5,147,562 A | 9/1992 | Heyman | |
| 5,705,055 A | 1/1998 | Holloway et al. | |
| 5,885,424 A | 3/1999 | Davis et al. | |
| 5,951,456 A | 9/1999 | Scott | |
| 6,055,859 A | 5/2000 | Kozuka et al. | |
| 6,077,400 A | 6/2000 | Kartchner | |
| 6,860,979 B2 | 3/2005 | Sams | |
| 6,955,753 B1 | 10/2005 | Gomez | |
| 9,249,650 B2 | 2/2016 | Bruce et al. | |
| 2002/0015585 A1 | 2/2002 | Jensen | |
| 2006/0237372 A1 | 10/2006 | Arciszewski et al. | |
| 2008/0221226 A1 | 9/2008 | Coutinho et al. | |
| 2009/0107558 A1 | 4/2009 | Quigley | |
| 2012/0152517 A1 | 6/2012 | Wallace et al. | |
| 2016/0082365 A1 | 3/2016 | Miralles et al. | |
| 2017/0254564 A1 * | 9/2017 | Everly | H05B 3/04 |

FOREIGN PATENT DOCUMENTS

| | | |
|---|---|---|
| CN | 101037612 | 11/1998 |
| CN | 2502767 | 7/2002 |
| CN | 2539559 | 3/2003 |
| CN | 2669953 | 1/2005 |
| CN | 1589947 | 3/2005 |
| CN | 1648058 | 8/2005 |
| CN | 2721201 | 8/2005 |
| CN | 1672761 | 9/2005 |
| CN | 2765652 | 3/2006 |
| CN | 1295007 C | 2/2007 |
| CN | 1298814 C | 2/2007 |
| CN | 201181904 | 1/2009 |
| CN | 100506941 | 7/2009 |
| CN | 101550353 | 10/2009 |
| CN | 101845105 | 9/2010 |
| CN | 101161789 | 11/2010 |
| CN | 102091439 | 6/2011 |
| CN | 104684624 | 6/2015 |
| EP | 0-072628 | 2/1983 |
| EP | 0-544158 | 6/1993 |
| EP | 1254669 | 11/2002 |
| JP | 2005169186 | 6/2005 |
| WO | 1994000757 | 1/1994 |
| WO | 2005030360 | 4/2005 |
| WO | 2009067362 | 5/2009 |
| WO | 2010134822 | 11/2010 |
| WO | WO-2010134822 A1 * | 11/2010 ......... B01D 17/0208 |

OTHER PUBLICATIONS

Hirasaki et al., "Separation of Produced Emulsions from Surfactant Enhanced Oil Recovery Processes," American Chemical Society, Energy and Fuels, 2010, <http://porousmedia.rice.edu/resources/Emulsion_FOR_Produced.pdf>, 7 pages.

Karcher et al., "Interfacial energy during the emulsification of water-in-heavy crude oil emulsions," Brazilian Journal of Chemical Engineering, Mar. 2015, 32(1), <http://www.scielo.br/scielo.php?script=sci_arttext&pid=S0104-66322015000100127>, 18 pages.

Kemmer, "Emulsion Breaking," Nalco Water Handbook, Chapter 11, Second Edition, 1988; pp. 11.1-11.18 <http://ssu.ac.ir/cms/fileadmin/user_upload/Daneshkadaha/dbehdasht/markaz_tahghighat_olom_va_fanavarihaye_zist_mohiti/e_book/pasmand/water/58723_11.pdf>, 18 pages.

Otzisk, digitalrefining.com [online], "Oil/water separation technologies," Kurita Europe, Apr. 2013, <http://www.digitalrefining.com/article/1000798,Oil_water separation_technologies.html>, 2 pages.

PetroWiki, "Emulsion treating methods," published by SPE International, <http://petrowiki.org/Emulsion_treating_methods>, 6 pages.

PetroWiki, "Oil demulsification," published by SPE International, <http://petrowiki.org/Oil_demulsification#Temperature>, 11 pages.

White Paper, "Emulsion Breaking Techniques for Oil in Water Solvent Extractions," Spectro Scientific, <http://www.spectrosci.com/product/infracal-2-atr-sp-oil-in-water-analyzer/?fileID=8a808189505a61330150a5b2df8f454c>, 1 pages.

CN Office Action in Chinese Appln. No. 201880034055, dated May 6, 2021, 15 pages, with English translation.

EPO Communication Pursuant to Article 94(3) in European Appln. No. 18733718.3, dated Nov. 11, 2020, 4 pages.

Gulf Cooperation Council Examination Report issued in GCC Application No. GC 2018-35354 dated Nov. 21, 2019, 5 pages.

Gulf Cooperation Council Examination Report issued in GCC Application No. GC 2018-35354 dated Mar. 4, 2020, 4 pages.

PCT International Search Report and Written Opinion in International Appln. No. PCT/US2018/033850, dated Jul. 26, 2018, 17 pages.

CN Office Action in Chinese Appln. No. 201880034055, dated Jan. 17, 2022, 7 pages, with English Translation, 7 pages.

* cited by examiner

FIG. 3

CRUDE HYDROCARBON FLUIDS DEMULSIFICATION SYSTEM

CROSS-REFERENCE TO RELATED APPLICATIONS

This application is a divisional of and claims the benefit of U.S. application Ser. No. 15/601,491, filed on May 22, 2017, the entire contents of which are incorporated by reference in its entirety.

FIELD OF INVENTION

This disclosure relates to the demulsification of multi-phase fluids, for example, fluids flowing through flowlines in a hydrocarbon processing facility.

BACKGROUND

When processing crude fluids during hydrocarbon production, hydrocarbon liquids and water become emulsified within one another. The two liquids are separated to meet refining and pipeline specifications. Separation can be done using gravity separation and retention time, demulsification chemicals, or other methods. Flowlines are used to transport crude fluids from one processing stage to another within a refining or production plant. Once the crude fluid is refined and processed, it can be transported through a pipeline that connects a production or production facility to a separate facility.

SUMMARY

This disclosure describes technologies relating to a crude demulsification system.

An example implementation of the subject matter described within this disclosure is a flowline fluid demulsification system with the following features. An elongate, horizontally level, pipe includes a circumferential wall. The pipe flows, within the circumferential wall, process fluid that includes a first fluid and a second fluid immiscible with the first fluid. The first fluid and the second fluid are separated by an interfacial layer. Heating coils are disposed within the pipe. Each heating coil passes through an interior region of the pipe between the circumferential wall at a respective height from a bottom of the pipe. The heating coils generate heat. A controller is connected to the heating coils. The controller triggers at least one of the heating coils that is nearest to a location of the interfacial layer within the interior region to apply heat to the interfacial layer. The heat is sufficient to at least partially demulsify the interfacial layer.

Aspects of the example implementation, which can be combined with the example implementation alone or in combination, include the following. The heating coils pass through the interior region of the pipe between the circumferential wall at different heights along an entire axial length of the pipe.

Aspects of the example implementation, which can be combined with the example implementation alone or in combination, include the following. The heating coils can include an electrical heating coil and an electrical power supply.

Aspects of the example implementation, which can be combined with the example implementation alone or in combination, include the following. The heating coils can include a first heating coil passing through the interior region at a first height from the bottom of the pipe that is substantially one third of a diameter of the pipe, a second heating coil passing through the interior region at a second height from the bottom of the pipe that is substantially two thirds of the diameter of the pipe, as illustrated in FIGS. 2C and 2D, for example.

Aspects of the example implementation, which can be combined with the example implementation alone or in combination, include the following. Each of the heating coils can be encased in a protective and heat-conductive sheath configured to protect the heating coils.

Aspects of the example implementation, which can be combined with the example implementation alone or in combination, include the following. The process fluid can include water and hydrocarbon liquids. The heat generated by the heating coils is sufficient to at least partially demulsify the water and hydrocarbon liquids.

Aspects of the example implementation, which can be combined with the example implementation alone or in combination, include the following. A separator with a separator inlet is fluidically coupled to an outlet of the pipe. The separator receives the fluid with a heated interfacial layer at the separator inlet.

Aspects of the example implementation, which can be combined with the example implementation alone or in combination, include the following. A demulsifier can at least partially demulsify the interfacial layer. A demulsifier inlet can receive the demulsifier.

Aspects of the example implementation, which can be combined with the example implementation alone or in combination, include the following. The demulsifier inlet can be positioned on the pipe.

An example implementation of the subject matter described within this disclosure is a method with the following features. A process fluid comprising a first fluid and a second fluid immiscible with the first fluid is received in a flowline. The first fluid and the second fluid are separated by an interfacial emulsion layer. The flowline includes heating coils. Each heating coil passes through an interior region of a pipe between a circumferential wall at a respective height from a bottom of the pipe. The heating coils generate heat. at least one of the plurality of heating coils within a pre-heater is selectively triggered to heat the interfacial layer based at a height of the interfacial layer from the bottom of the pipe.

Aspects of the example method, which can be combined with the example method alone or in combination, include the following. The process fluid can include water and hydrocarbons.

Aspects of the example method, which can be combined with the example method alone or in combination, include the following. the process fluid is at least partially demulsified in response to applying heat to the interface height of the process fluid.

Aspects of the example method, which can be combined with the example method alone or in combination, include the following. Each of the heating coils can be positioned at a different height within the pre-heater.

Aspects of the example method, which can be combined with the example method alone or in combination, include the following. The heating coils can include an electrical heating coil.

Aspects of the example method, which can be combined with the example method alone or in combination, include the following. The heating coils include two heating coils.

Aspects of the example method, which can be combined with the example method alone or in combination, include the following. the process fluid is sent from the pre-heater to a separator.

Aspects of the example method, which can be combined with the example method alone or in combination, include the following. The process fluid can be further demulsified within the separator.

Aspects of the example method, which can be combined with the example method alone or in combination, include the following. The process fluid is demulsified within the separator using demulsifying chemicals, electrostatic grids, ultrasonics, or sand jetting.

An example implementation of the subject matter described within this disclosure is a method with the following features. A process fluid receiving by a pre-heater. One or more heating coils are selecting to power from out of a set of heating coils. Heat is applied to an interface of the process fluid by a selected heating coil. the process fluid is at least partially demulsified in response to applying heat to an interface height of the process fluid. The process fluid is sent from the pre-heater to a separator. The process fluid is further demulsified within the separator.

The details of one or more implementations of the subject matter described in this specification are set forth in the accompanying drawings and the description that follows. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When producing and processing hydrocarbons, for example, crude-oil, water is often emulsified within crude-oil and should be separated from the crude-oil before being transported through pipelines to separate facilities. That is, the crude-oil must be dried or dehydrated. A low-water content in the crude-oil is essential for crude-oil transportation, particularly in pipelines, as to prevent hydrate formation. Many pipeline companies have specifications limiting the allowable amount of water within crude-oil to prevent such a hydrate formation from occurring within the pipeline. Dry crude-oil can also be less corrosive than wet crude-oil and can be easier to process in refining operations. For example, crude fluid can be produced on an off-shore platform. That is, crude-fluid is produced from a completed production well. Before the crude-oil from the crude-fluid produced on the off-shore platform can be transported to a refinery onshore, the crude-oil must be sufficiently dehydrated. Proper separation, demulsion, and dehydration can take place on the offshore platform before the dehydrated crude-oil enters the pipeline. In winter months, when the ambient temperature is lower, demulsifying the crude oil can become more difficult. The lower ambient temperatures can create bottlenecks in processing plants due to increased retention times necessary to separate the water from the oil.

There are several ways to separate water that has been emulsified in oil, such as gravity separation, demulsifying chemicals, electrostatic grids, and many others. All of these methods involve a bulk of the separation taking place within a large separator or pressure vessel. Such large quantities of fluid can take a substantial amount of time and energy to fully demulsify and separate.

This disclosure describes partially demulsifying and separating water that has emulsified into oil before the fluid has entered the separator. The separation is achieved by applying heat with a pre-heater to an interface layer between the water and the oil within the flowline upstream of the separator to initiate and accelerate the demulsification and separation process. The targeted heating is more effective and requires less energy than traditional demulsification and separation methods. For example, the in-line separator can consume 20% of the power used by a separator.

Figure 1:
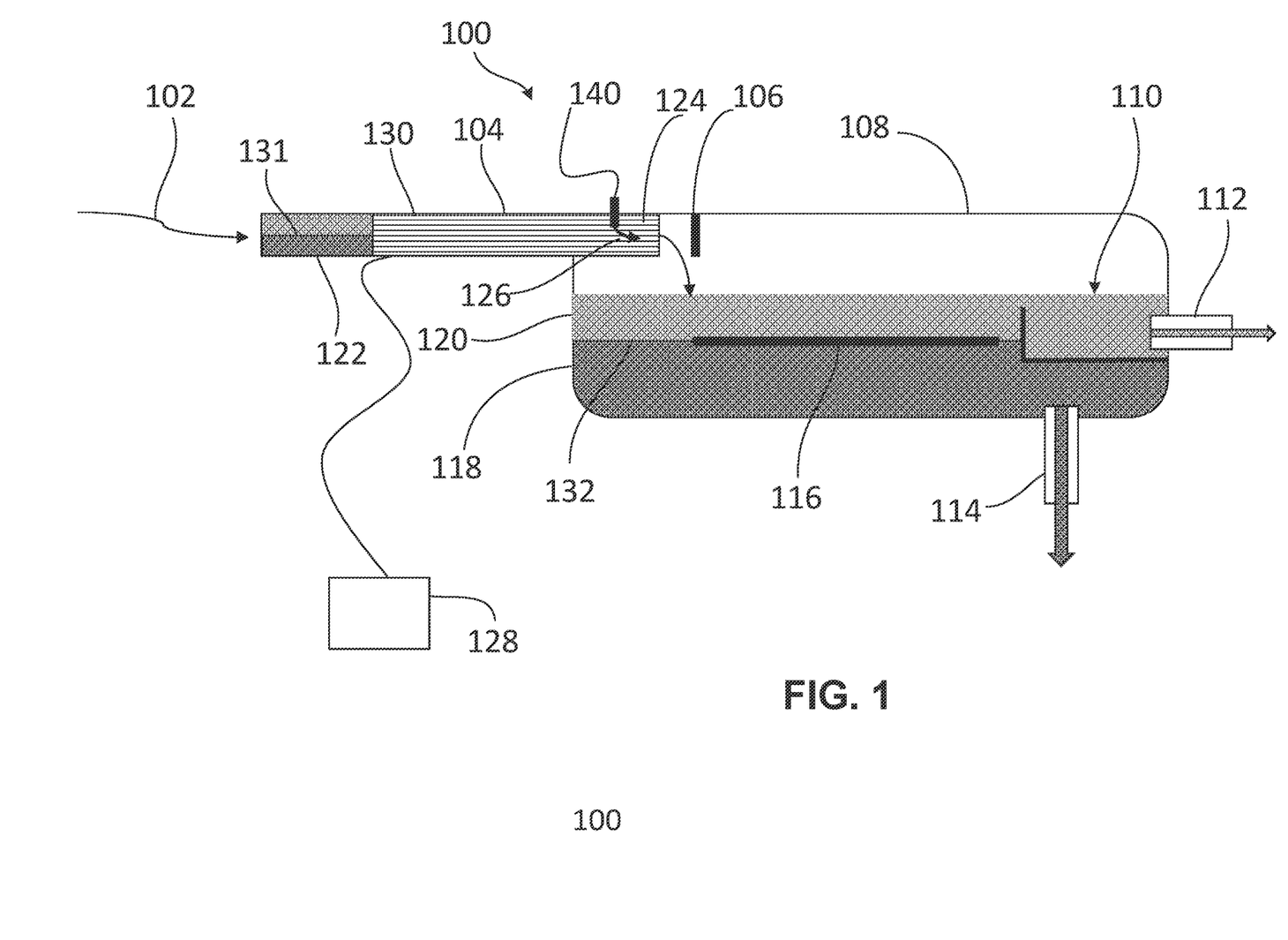
FIG. 1 is a side cross-sectional schematic diagram of a separator with an inlet pre-heater.

FIG. 1 shows a flowline fluid demulsification and separation system 100 that is capable of separating and demulsifying water and crude-oil or water and other hydrocarbon liquids, such as condensate. The separation system 100 can be located in any production or refining facility that processes crude-fluids. In some implementations, the crude-fluid can be from a wellbore, an upstream separator, or an upstream facility. The separation system 100 includes a flowline 122 through which a process fluid 102 flows. The process fluid 102 can include crude fluids including water and crude-oil. In the context of this disclosure, a flowline, such as flowline 122, transports fluid between different sections of a single facility while pipelines transport fluid between different facilities. The flowline 122 is an elongate, substantially horizontally level, pipe with a circumferential wall 130. The flowline 122 can be sufficiently level to allow for a consistent emulsion layer to form within the flowline 122. The process fluid 102 flows, within the circumferential wall, a process fluid 102 that includes a first fluid and a second fluid immiscible with the first fluid. Such fluids can include water and hydrocarbon liquids, such as crude-oil. In some implementations, the process fluid 102 can include gas as well. The first fluid and the second fluid are separated by an interfacial layer 132. The flowline 122 can be of sufficient length to allow bulk separation to occur within the flowline 122. That is, an upper portion of the flowline 122 is filled predominantly with crude-oil and a lower portion of the flowline 122 is filled predominantly filled with water with an emulsion layer in between the two portions.

Downstream of the flowline 122 is a pre-heater 104. The pre-heater 104 can include heating coils, such as heating coils 202 (FIGS. 2A-2D) that generate heat; the heating coils can be disposed within a pipe. The heating coils can be placed at a height approximately equal to the interfacial layer 131 to specifically heat the emulsion layer and to at least partially demulsify the process fluid 102. If electrical heating coils are used, they can be made of any heating coil material, such as nichrome. To regulate the pre-heater 104, a controller 128 can be connected to the heating coils. The controller 128 can trigger at least one of the heating coils that is nearest to the location of the interfacial layer 131 within the interior region or the pre-heater 104 to apply heat to the interfacial layer 131. The targeted application of heat is sufficient to at least partially demulsify the heated interfacial layer 131. In some implementations, a demulsifier (a chemical designed to demulsify process fluid), as indicated by the flow arrow 126 in FIG. 1, can be injected into either the pre-heater 104 at a demulsifier inlet 140 or into the separator 108.

Figure 2A:
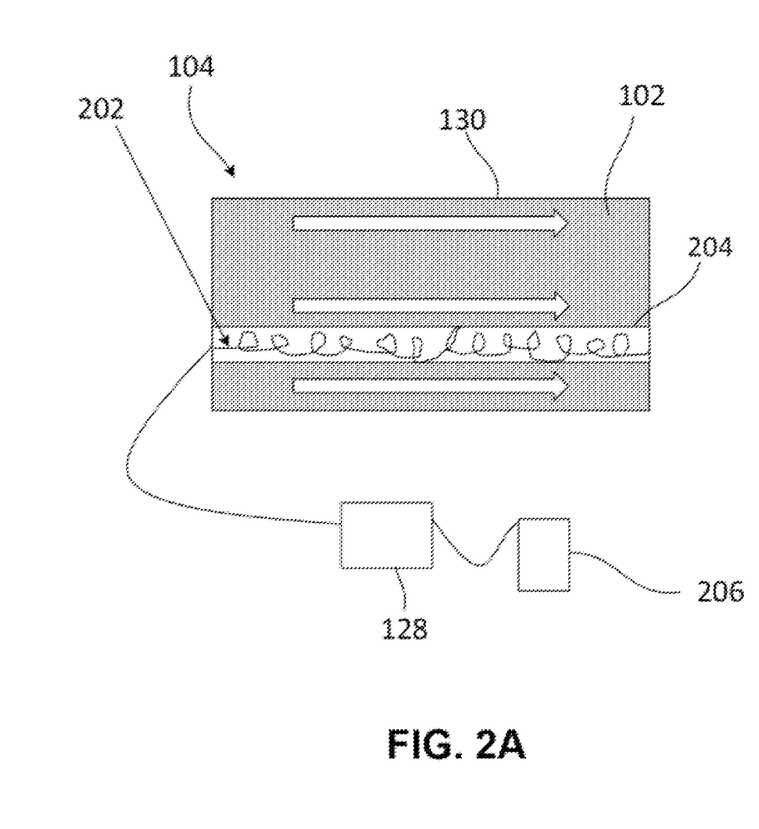
FIGS. 2A-2B show detailed cross-sectional views of the inlet pre-heater.
Figure 2B:
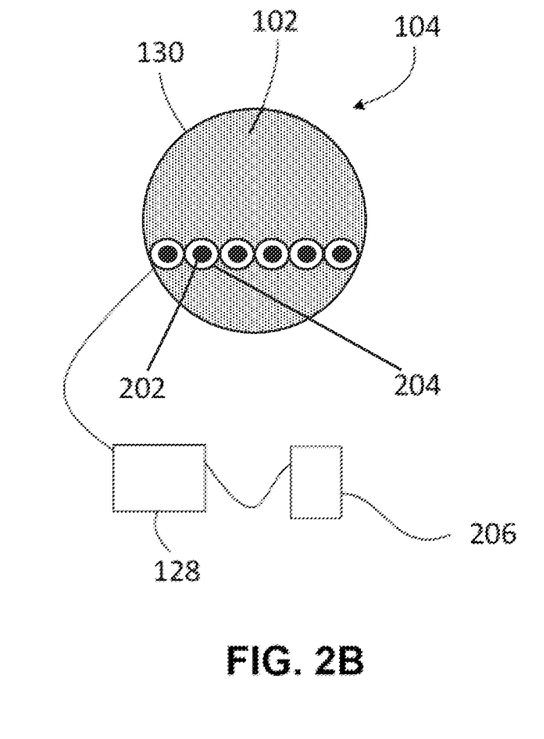
Figure 2C:
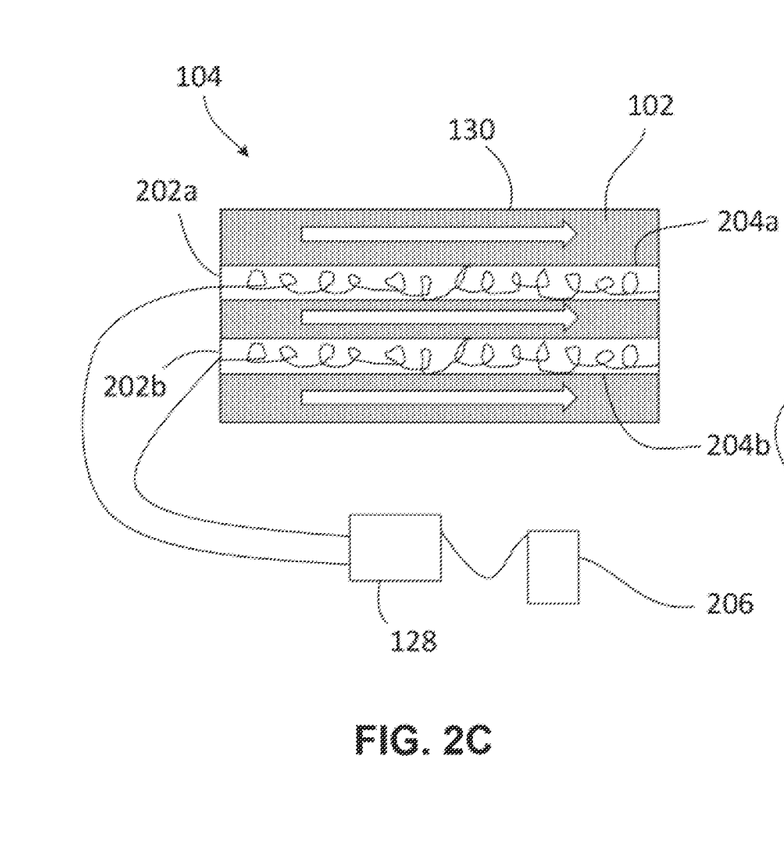
FIGS. 2C-2D show detailed cross-sectional views of the inlet pre-heater.
Figure 2D:
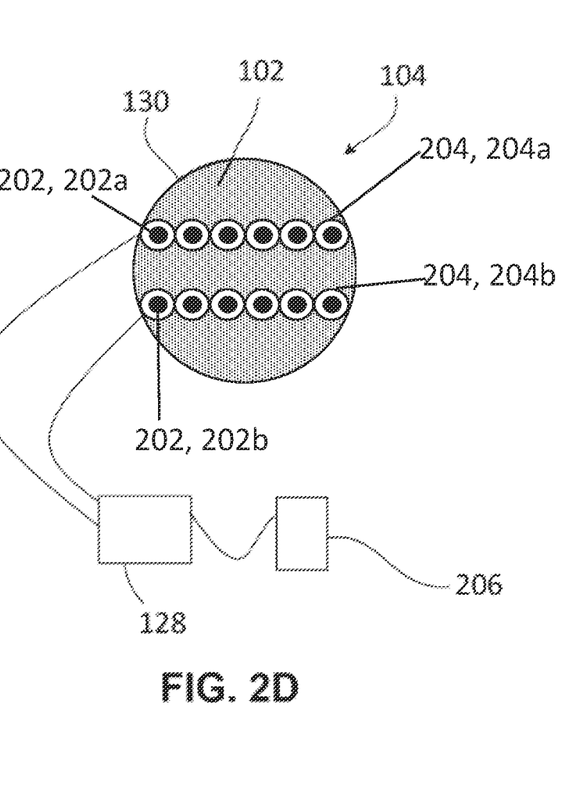

FIGS. 2A-2B show a side cut-away view and a front view of an example pre-heater 104, respectively. In some implementations, the pre-heater 104 can include heating coils 202 positioned at a set height along the pre-heater 104. In other words, the heating coils 202 passes through an interior region of the pipe between the circumferential wall 130 at a respective height from a bottom of the pipe. The height is set to match the height of the interface level within the pre-heater 104. In some implementations, such as the implementation illustrated in FIGS. 2A and 2B, the heating coils 202 can pass through the interior region of the pipe along an entire axial length of the pre-heater 104. The length of the heater coils can be dependent upon the diameter of the flowline. The heating coils 202 are encased in a protective and heat-conductive sheath 204 that protects the heating coils 202 from the process fluid 102. The protective sheaths 204 protect the heating coils 202 from the process fluid 102. The sheaths 204 can be made of metal, ceramic, or any other material suitable to protect heating coils in a flowline.

FIGS. 2C-2D show a side cut-away view and a front view of an example pre-heater 104, respectively. In some implementations, the pre-heater 104 can include multiple layers of heating coils 202 positioned at different heights. In other words, each heating coil 202 passes through an interior region of the pipe between the circumferential wall 130 at a respective height from a bottom of the pipe. The varying heights allow individual coils to be used in the event of a process upset or slugging event; such an event can affect the height of the interface level within the pre-heater 104. In some implementations, such as the implementation illustrated in FIGS. 2C and 2D, the heating coils 202 can pass through the interior region of the pipe along an entire axial length of the pre-heater 104. In some implementations, the heating coils 202 can extend only partially along the length of the pre-heater 104. The pre-heater 104 can include two heater coils 202: a first heating coil 202a and a second heating coil 202b. In some implementations, more than two heating coils can be used. The first heating coil 202a passes through the interior region at a first height from the bottom of the pipe that is substantially one third of a diameter of the pipe, and the second heating coil 202b passes through the interior region at a second height from the bottom of the pipe that is substantially two thirds of the diameter of the pipe, as illustrated in FIGS. 2C and 2D. Each of the heating coils 202 is encased in a protective and heat-conductive sheath 204 that protects the heating coils 202 from the process fluid 102. The first heating coil 202a is encased in a first protective sheath 204a while the second heating coil 202b is encased in a second protective sheath 204b. The protective sheaths 204 protect the heating coils 202 from the process fluid 102. The sheaths 204 can be made of metal, ceramic, or any other material suitable to protect heating coils in a flowline.

Figure 2E:
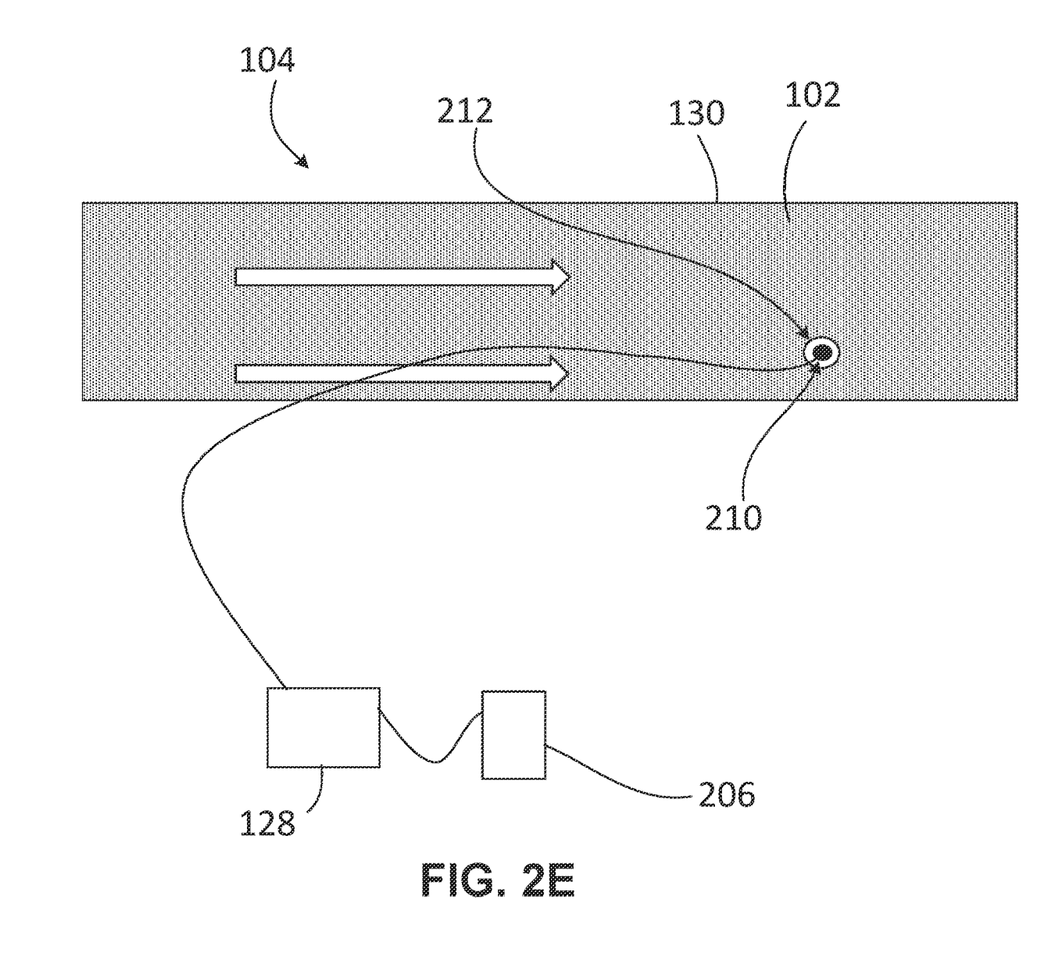
FIGS. 2E-2F show detailed cross-sectional views of the inlet pre-heater.
Figure 2F:
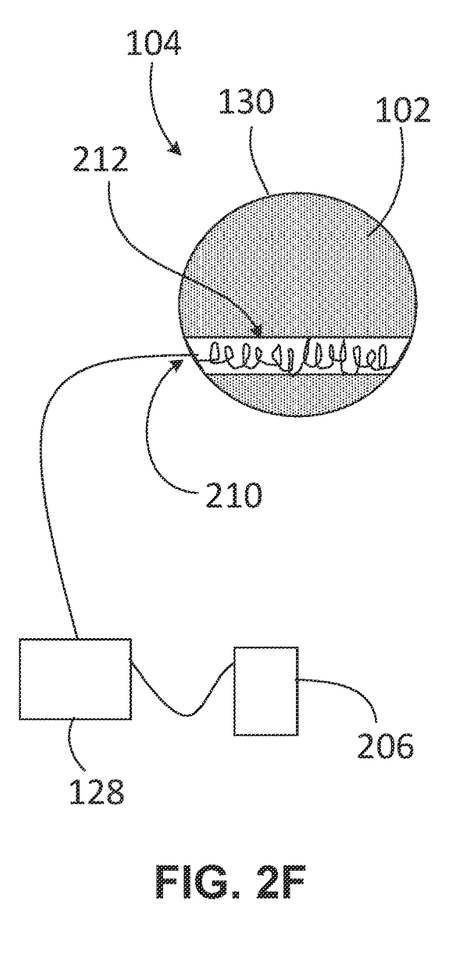

FIGS. 2E-2F show a side cut-away view and a front view of an example pre-heater 104. In some implementations, the pre-heater 104 can include heating coils 210. In some implementations, such as the implementation illustrated in FIGS. 2E and 2F, the heating coils 210 can pass through the interior region of the pipe laterally across the pre-heater 104. The heating coils 210 can be encased in a protective and heat-conductive sheath 212 that protects the heating coils 210 from the process fluid 102. The sheath 212 can be made of metal, ceramic, or any other material suitable to protect heating coils in a flowline.

Figure 2G:
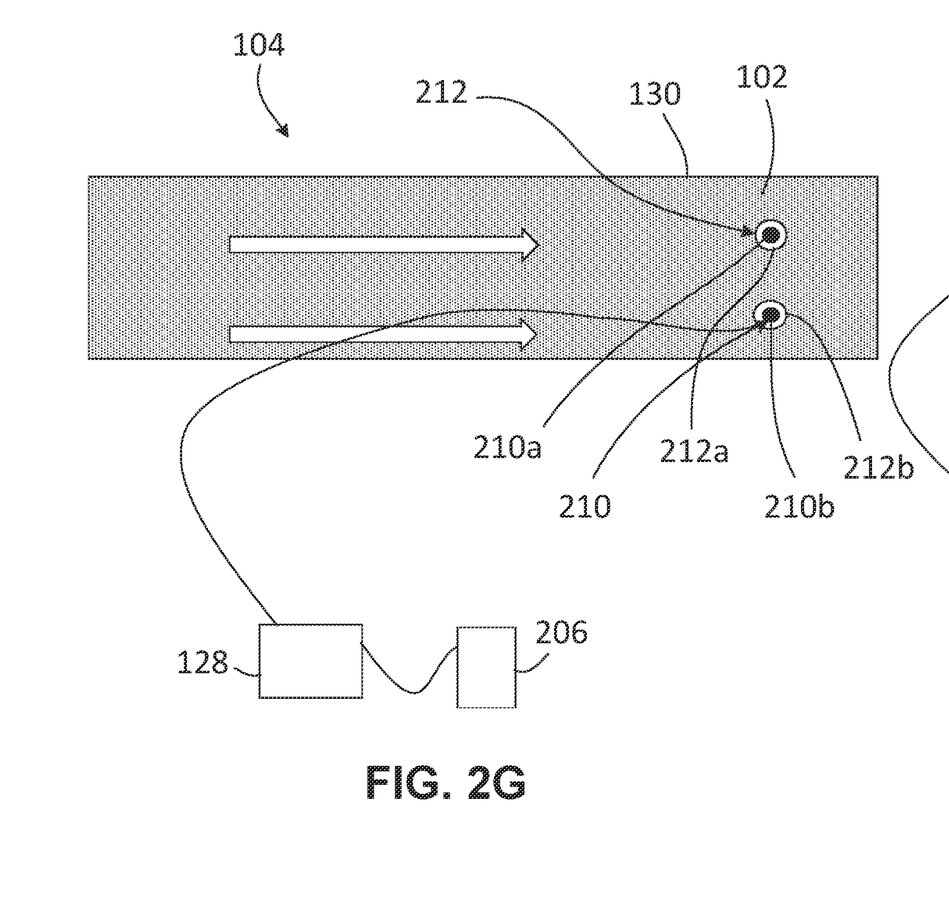
FIGS. 2G-2H show detailed cross-sectional views of the inlet pre-heater.
Figure 2H:
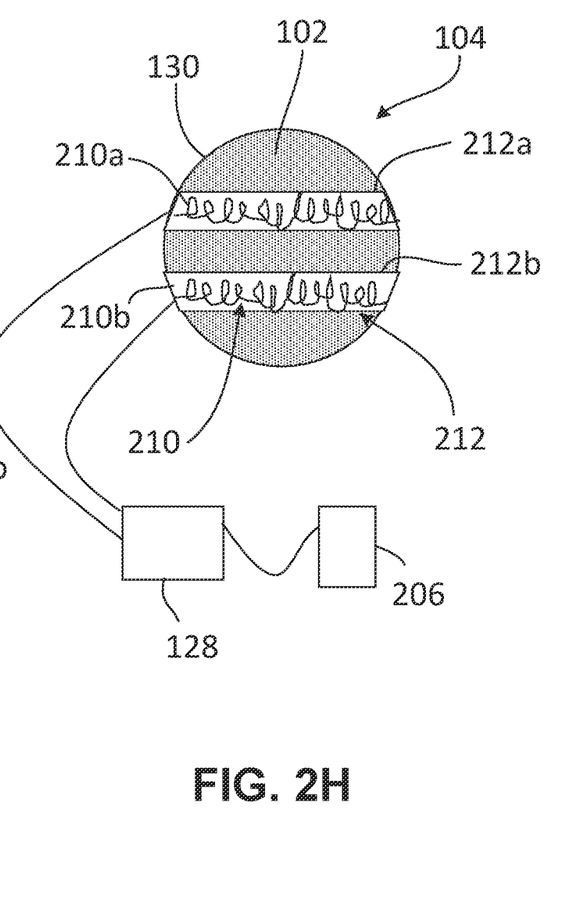

FIGS. 2G-2H show a side cut-away view and a front view of an example pre-heater 104. In some implementations, the pre-heater 104 can include multiple heating coils 210 positioned at different heights. In other words, each heating coil 210 passes through an interior region of the pipe between the circumferential wall 130 at a respective height from a bottom of the pipe. The varying heights allow individual coils to be used in the event of a process upset or slugging event; such an event can affect the height of the interface level within the pre-heater 104. In some implementations, such as the implementation illustrated in FIGS. 2G and 2H, the heating coils 210 can pass through the interior region of the pipe laterally across the pre-heater 104. The pre-heater 104 can include multiple heater coils 210: a first heating coil 210a and a second heating coil 210b. Each of the heating coils 210 can be encased in a protective and heat-conductive sheath 212 that protects the heating coils 210 from the process fluid 102. The first heating coil 210a is encased in a first protective sheath 212a while the second heating coil 210b is encased in a second protective sheath 212b. The protective sheaths 212 protect the heating coils 210 from the process fluid 102. The sheaths 212a and 212b can be made of metal, ceramic, or any other material suitable to protect heating coils in a flowline.

Figures 2I, 2J:
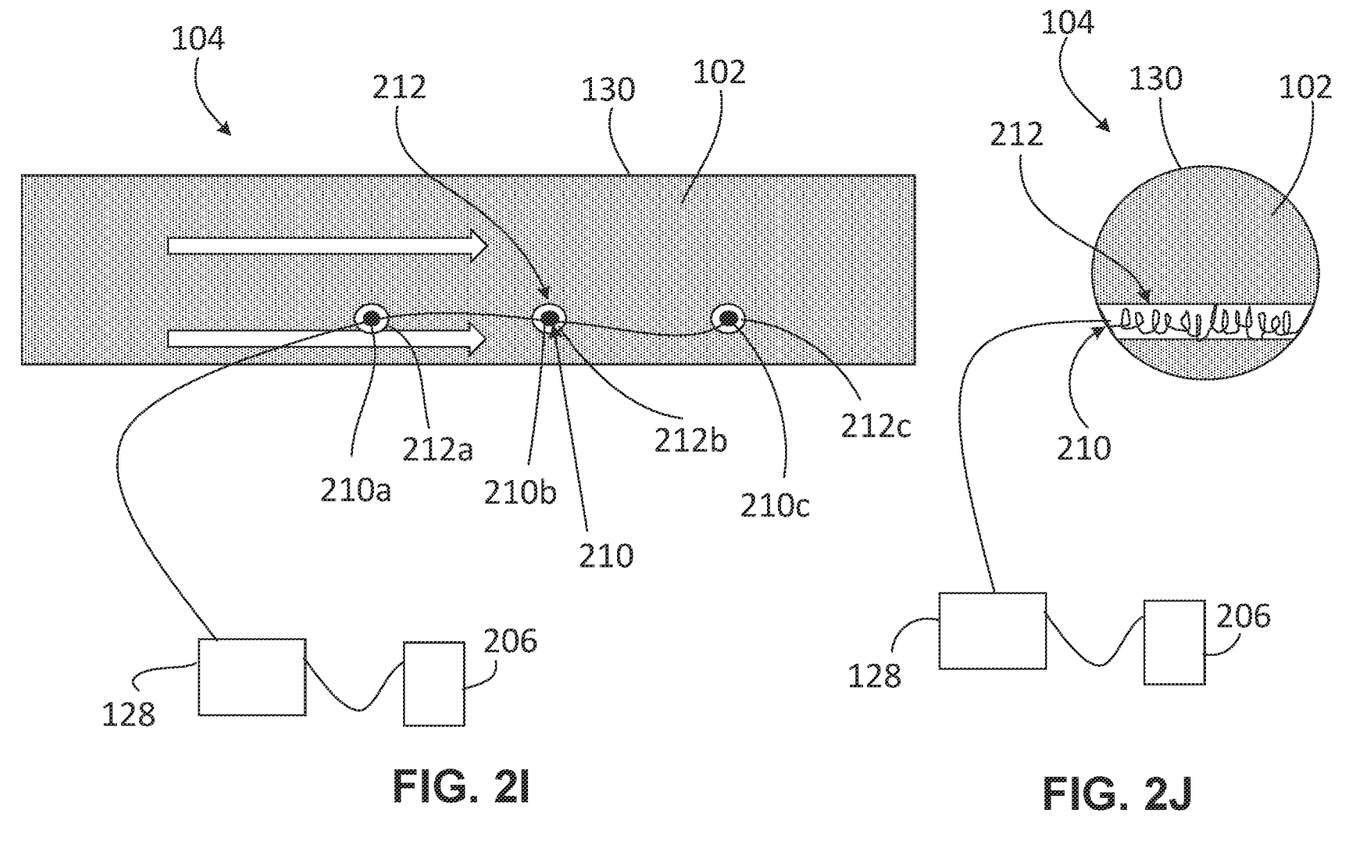
FIGS. 2I-2J show detailed cross-sectional views of the inlet pre-heater

FIGS. 2I-2J show a side cut-away view and a front view of an example pre-heater 104. In some implementations, the pre-heater 104 can include multiple heating coils 210. In some implementations, such as the implementation illustrated in FIGS. 2I and 2J, the heating coils 202 can pass through the interior region of the pipe laterally across the pre-heater 104. The pre-heater 104 can include multiple heater coils 210: a first heating coil 210a, a second heating coil 210b, and a third heating coil 210c. In this implementations, each of the heating coils 210 is positioned at the same height along the length of the pre-heater. Each of the heating coils 210 is encased in a protective and heat-conductive sheath 212 that protects the heating coils 210 from the process fluid 102. The first heating coil 210a is encased in a first protective sheath 212a, the second heating coil 210b is encased in a protective sheath 212b, and the third heating coil 210c is encased in a third protective sheath 212c.

In some implementations, the heating coils, such as heating coils 202 or heating coils 210, can include an electrical heating coil. In such an implementation, an electrical power supply 206 provides current to heat up at least one of the heating coils 202 or heating coils 210. In some implementations, different numbers heating coils 210 can be activated based on a temperature of a process fluid 102. In such an implementation, a sensor can send a signal to a controller. The controller then activates the necessary number of coils based on the desired load. In some implementations, the heating coils 202 or 210 can include coiled tubing through which heat media can be flowed to heat up the heating coils 202 or 210. In such an implementation, a heat media pump flows the heat media through the heating coils and a temperature regulator controls the temperature of the heat media fluid.

in some implementations, a separator 108 can be positioned downstream of the pre-heater 104. The separator 108 has a separator inlet 124 that is fluidically coupled to an outlet 124 of the pre-heater 104. In some implementations, the separator inlet 124 and the pre-heater outlet 124 can be the same opening. The separator 108 receives the process fluid 102 that has had the interfacial layer 132 heated by the pre-heater 104 prior to entering the separator 108. As the process fluid 102 enters the separator, it can hit a deflector plate 106. The deflector plate helps release entrapped gasses from the process fluid and confines turbulent fluid flow to one end of the separator. In some implementations, a different inlet can be used. For example, a spreader inlet can be used. Once in the separator 108, the process fluid 102 further separates into an upper layer of oil 120 and a lower layer of water 118. The separator 108 can contain a demulsion apparatus 116 that can further separate and demulsify the process fluid 102. Such a demulsion apparatus can include demulsifying chemicals, electrostatic grids, ultrasonic emitters, sand jets, heaters or any other apparatus that can further demulsify the process fluid. Once the process fluid 102 has been fully demulsified and separated into separate water 118 and oil 120 phases, the oil phase is directed into an oil bucket 110 and out an oil outlet 112 to either further refining or a pipeline while the water 118 phase is directed out the bottom water outlet 114 where the water can be cleaned and released to the environment.

Figure 3:
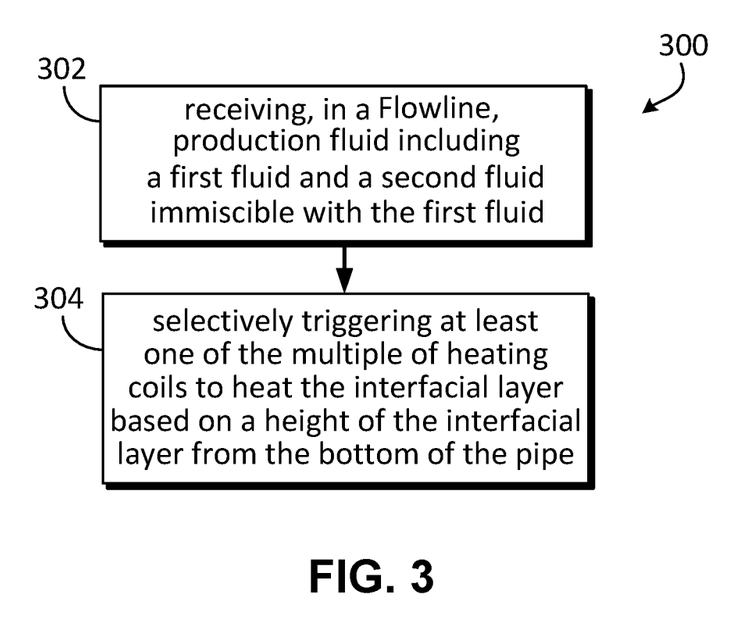
FIG. 3 is a flowchart showing an example method for at least partially demulsifying a fluid.

FIG. 3 is a flowchart showing a method 300 for partially demulsifying a process fluid prior to the process fluid entering the separator. At 302, process fluid that include a first fluid and a second fluid immiscible with the first fluid is received in a flowline. The first fluid and the second fluid are separated by an interfacial emulsion layer. The height of the interfacial emulsion layer from the bottom of the pipe can be determined, and at 304 at least one of the plurality of heating coils is selectively triggered to heat the interfacial layer 132 based on a height of the interfacial layer 131 from the bottom of the pipe. In some applications, the heating coil can be selected manually by an operator. Each of the plurality of heating coils can be positioned at a different height within the pre-heater. The process fluid is at least partially demulsified in response to applying heat to the interface height of the process fluid. After passing though the pre-heater, the process fluid is sent to a separator where the process fluid can be further demulsified. Demulsifying the process fluid within the separator can involve using demulsifying chemicals, electrostatic grids, ultrasonics, sand jetting, or any other apparatus or method to demulsify the process fluid.

Thus, particular implementations of the subject matter have been described. Other implementations are within the scope of the following claims.

What is claimed is:

1. A method of demulsifying a process fluid, the method comprising:
providing a pipe that comprises a circumferential wall defining a fluid inlet, a fluid outlet, and an interior region that provides a fluid flow-through area of the pipe;
providing a plurality of heating coils in a first section of the pipe that are configured to generate heat and that pass through the interior region of the pipe respectively at a plurality of heights from a bottom end of the pipe;
flowing the process fluid through the pipe, the process fluid comprising a first fluid and a second fluid that is immiscible with the first fluid, and the first fluid and the second fluid being separated by an interfacial layer, wherein the fluid inlet, the fluid outlet, an elongate axis of the pipe, and a bulk flow direction of the pipe together form an in-line arrangement;
achieving a substantially constant height of the interfacial layer in line with the in-line arrangement within a second section of the pipe that is located upstream of the first section;
identifying a heating coil, from among the plurality of heating coils, which has a height, from among the plurality of heights, that is nearest to a height of the interfacial layer;
selectively activating the heating coil from among the plurality of heating coils;
selectively applying targeted heat to the interfacial layer from the heating coil;
at least partially demulsifying the interfacial layer of the process fluid with the targeted heat;
flowing the process fluid to a separator with the interfacial layer having been heated by the targeted heat; and
within the separator, heating an interface between the first fluid and the second fluid with an electrostatic grid located on the interface.

2. The method of claim 1, wherein the first fluid comprises water and the second fluid comprises hydrocarbons.

3. The method of claim 1, wherein the plurality of heating coils comprises an electrical heating coil.

4. The method of claim 1, wherein the plurality of heating coils comprises two heating coils.

5. The method of claim 1, wherein the plurality of heating coils are part of a pre-heater, and wherein the method further comprises flowing the process fluid from the pre-heater to the separator with the interfacial layer having been heated by the targeted heat.

6. The method of claim 5, further comprising further demulsifying the process fluid within the separator.

7. The method of claim 6, further comprising delivering a demulsification chemical to the process fluid upstream of an inlet of the separator.

8. The method of claim 6, wherein the separator further comprises a demulsification apparatus arranged to further demulsify the process fluid within the separator.

9. The method of claim 8, further comprising further demulsifying the process fluid within the separator using the electrostatic grid and one or more of ultrasonics, and sand jetting.

10. The method of claim 6, further comprising directing turbulent flow of the process fluid toward one end of the separator.

11. The method of claim 6, wherein the pipe is directly connected to the separator.

12. The method of claim 1, wherein the pipe is horizontally level and the method further comprises flowing the process fluid along the elongate axis of the pipe.

13. The method of claim 12, wherein the plurality of heating coils is oriented substantially parallel to the bulk flow direction of the pipe and to the interfacial layer.

14. The method of claim 1, further comprising selectively applying the targeted heat to the interfacial layer along an entire length of the heating coil.

15. The method of claim 1, further comprising selectively activating a selected number of heating coils of the plurality of heating coils based on a temperature of the process fluid.

16. The method of claim 1, wherein the plurality of heating coils extends through the interior region of the pipe at the plurality of respective heights along an entire axial length of the pipe.

17. The method of claim 1, wherein each heating coil of the plurality of heating coils is encased in a protective and heat-conductive sheath configured to protect the heating coil.

* * * * *